United States Patent
Filicetti et al.

(10) Patent No.: US 11,082,573 B1
(45) Date of Patent: Aug. 3, 2021

(54) CONCEALED SCANNER

(71) Applicant: Craig A. Filicetti, Scottsdale, AZ (US)

(72) Inventors: Craig A Filicetti, Scottsdale, AZ (US); Sergey Pavlov, Chandler, AZ (US)

(73) Assignee: Craig A. Filicetti, Scottsdale, AZ (US)

(*) Notice: Subject to any disclaimer, the term of this patent is extended or adjusted under 35 U.S.C. 154(b) by 0 days.

(21) Appl. No.: 16/679,186

(22) Filed: Nov. 9, 2019

(51) Int. Cl.
| | |
|---|---|
| H04N 1/00 | (2006.01) |
| G06T 7/194 | (2017.01) |
| G06T 5/40 | (2006.01) |
| H04N 1/44 | (2006.01) |
| G06T 5/00 | (2006.01) |

(52) U.S. Cl.
CPC ......... *H04N 1/00519* (2013.01); *G06T 5/009* (2013.01); *G06T 5/40* (2013.01); *G06T 7/194* (2017.01); *H04N 1/4446* (2013.01); *G06T 2207/30176* (2013.01); *H04N 2201/043* (2013.01)

(58) Field of Classification Search
CPC ............ H04N 1/00519; H04N 1/4446; H04N 2201/043; H04N 1/44; H04N 1/00; G06T 7/194; G06T 5/009; G06T 5/40; G06T 2207/30176; G06T 2201/043
USPC .......................................................... 348/96
See application file for complete search history.

(56) References Cited

U.S. PATENT DOCUMENTS

| | | | | |
|---|---|---|---|---|
| 9,019,431 | B2* | 4/2015 | Phillips | F16M 13/04 348/376 |
| 2008/0267497 | A1* | 10/2008 | Fan | G06K 9/342 382/173 |
| 2010/0061655 | A1* | 3/2010 | Ma | G06T 5/002 382/275 |
| 2013/0080881 | A1* | 3/2013 | Goodspeed | G06F 16/34 715/251 |
| 2014/0334721 | A1* | 11/2014 | Cervin | G06K 9/00463 382/160 |
| 2015/0170138 | A1* | 6/2015 | Rao | G06Q 20/4012 705/41 |
| 2017/0142298 | A1* | 5/2017 | Fain | H04N 7/185 |
| 2020/0005035 | A1* | 1/2020 | Shustorovich | G06K 9/342 |

FOREIGN PATENT DOCUMENTS

| | | | |
|---|---|---|---|
| CN | 104643456 A | * | 5/2015 |
| CN | 108523344 A | * | 9/2018 |

* cited by examiner

*Primary Examiner* — Christopher S Kelley
*Assistant Examiner* — Kathleen M Walsh
(74) *Attorney, Agent, or Firm* — NovoTechIP International, PLLC

(57) ABSTRACT

A concealed card scanner has a camera that surreptitiously captures the image of a card, and a processor that processes the captured image to produce a processed image. An image screen displays the processed image. A cover conceals the camera during image capture and allows selective and surreptitious access to the image screen.

14 Claims, 8 Drawing Sheets

CONCEALED SCANNER

TECHNICAL FIELD

The present disclosure relates generally to a scanner for scanning an object and creating an image of that object, and more particularly, but not exclusively, to a scanner that is concealed so as to allow surreptitious scanning of an object to capture an image of that object, and subsequent surreptitious display of that object, such as writing on a business card.

BACKGROUND

There is a long history of being able to secretly obtain information provided by a person without that person being aware of the information being obtained. Psychics, spiritualists, magicians, which will hereafter be generically referred to as "performers", have employed various techniques and devices to learn information that a person has written down, for example. At some point after the information has been written down, the performer will surreptitiously peek or glance at the written information. Following the peek or glance, the performer can reveal the secretly obtained information to the person to thereby supposedly demonstrate that the performer has some ability to divine the information in an unnatural manner. While certain psychics and spiritualists have been known to use this ability to bilk unsuspecting victims, magicians use such techniques to entertain audiences.

Secretly obtaining written information, such as a word, or a drawing, has been achieved in many varied ways over the centuries. For example, switching a folded piece of paper (or "billet") on which the information has been written with a dummy billet, was described centuries ago in print. After switching the billets, the performer would simply open the billet at an opportune moment and read the information. There are numerous other methods of handling billets, business cards, and other written upon papers in order to secretly obtain information that do not use any devices that have been created and disseminated among the magic community. These methods of folding, tearing and switching do not use devices to obtain and record the information. However, such folding, tearing and switching can sometimes appear suspicious to the person (hereafter referred to as the "spectator"), since such processes can look contrived in some instances.

In addition to the methods of tearing, folding and switching, performers have used numerous types of devices to secretly obtain the spectator's information. For example, simple carbon paper hidden under a writing surface has been used to create an impression of the spectator's written information. Wax tablets have also been used. More modern methods include writing pads and a special pen whose movements are able to be sensed by the writing pad, for example. As the spectator writes on the paper, the sensor detects the position of the special pen and records the movements of the pen over the paper (and the sensor).

Another class of devices for secretly obtaining written information are wallets that allow a performer to view the information once the card has been placed into the wallet. Typically, the wallet has a pocket into which the card is placed after the writing has been done by the spectator. The card is seen by the spectator as being placed writing side down into the pocket, and the wallet put away by the performer. However, the wallet normally has an opening of some sort that allows the performer to surreptitiously peek at the information, usually when putting the wallet away. While avoiding the need for a special pen, such wallets suffer methodologically from the requirement that the performer must have the card placed back into the wallet in order to obtain the peek and hence the information. Having a spectator write something on a card and then immediately take it back and put it away in the performer's own wallet can also arouse suspicion in a spectator. Furthermore, it is often desirable for a performer to leave his or her business card with a spectator, so that taking a card back and putting it away makes this action less natural.

SUMMARY

There is a need for a device and method that allows a performer to secretly learn the information provided on an object, like a business card, without having to switch or manipulate the card, without having to put the card into a wallet, and without employing a special pen to write on the card, while keeping the capturing and peeking of the information concealed.

This and other needs are met by embodiments of the present disclosure which provide a concealed card scanner, comprising a camera that surreptitiously captures the image of a card, a processor that processes the captured image to produce a processed image, an image screen that displays the processed image, and a cover configured to conceal the camera during image capture and allow selective and surreptitious access to the image screen.

The earlier stated needs are also met by other embodiments of the present disclosure which provide a method of secretly viewing information on a card, comprising the steps of: positioning the card over a concealed camera such that the information is not viewable by a person, with the information being exposed to the concealed camera, the camera being concealed by a cover; causing the camera to capture an image of the card and the information on the card by surreptitiously actuating a concealed tactile actuator through the cover; and secretly peeking a display of the captured image by opening the cover to reveal the display only to a person opening the cover.

The concealed scanner and method of capturing an image and peeking at the captured image surreptitiously overcomes many of the concerns with prior devices and methods for obtaining and peeking at information. The card on which the information is located never has to be returned into the cover of the scanner, the card never has to be folded, bent or torn, and no special, i.e., suspicious, writing implements need be used to write the information on the card.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, well-known structures and components are shown in block diagram form in order to avoid obscuring the concepts of the subject technology.

Figure 1:
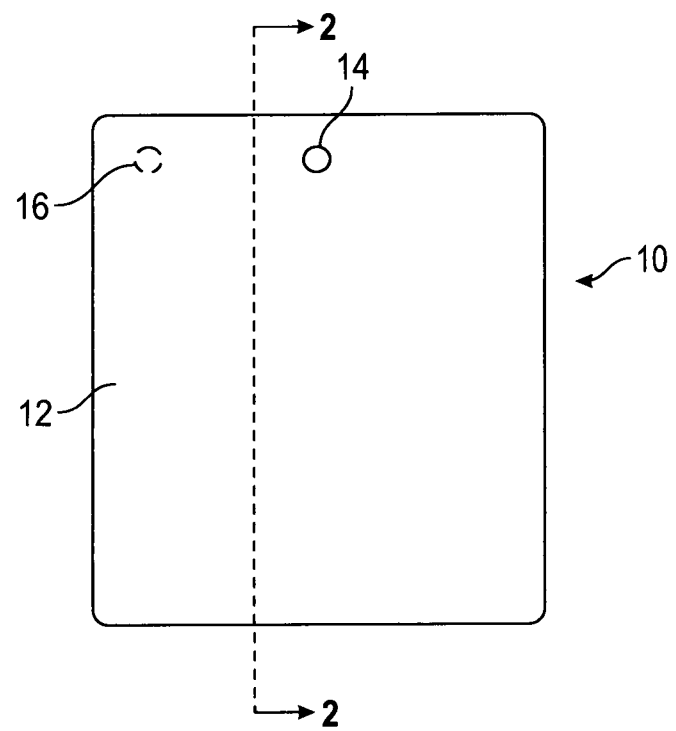
FIG. 1 is a plan view of a concealed scanner constructed in accordance with embodiments of the present disclosure.

FIG. 1 illustrates a plan view of a concealed scanner 10 constructed in accordance with certain embodiments of the present disclosure. The scanner 10 has a cover 12, which is configured to conceal the electronic circuitry and display of the scanner 10, yet allows for selective surreptitious capture of an image and peeking of an image screen that displays a representation of the captured image. In the illustrated embodiment of FIG. 1, the cover 12 is configured as a wallet that holds and conceals the electronic circuitry of the scanner 10. The cover 12 has an aperture 14 through which the camera (not shown in FIG. 1) of the scanner in the cover 10 is able to capture an image. The aperture 14 can be quite small, and therefore, not readily apparent to a spectator. Furthermore, the aperture 14 can be additionally disguised by forming a design of some sort on the cover 12. In the embodiment of a wallet, this could take the form of embossing, with the aperture 12 forming a natural part of the embossing. Alternatively, the design can include some metal applique, in which the aperture 12 forms part of the applique. Shown in phantom in FIG. 1 is a switch 16, which is a tactile switch 16 in certain embodiments. The switch 16 allows a performer to operate the camera of the scanner 10 to capture an image of an object, such as a card, in front of the aperture 14. The tactile nature of certain embodiments of the switch 16, allows the performer to feel the depression of the switch 16 and know that an image has been captured. This is important since there is no other feedback that an image has been captured while the cover 12 is closed. However, in certain embodiments, haptic feedback, such as a buzzing, can be provided to the performer through the cover to indicate successful actuation and capture of an image.

Figure 1A:
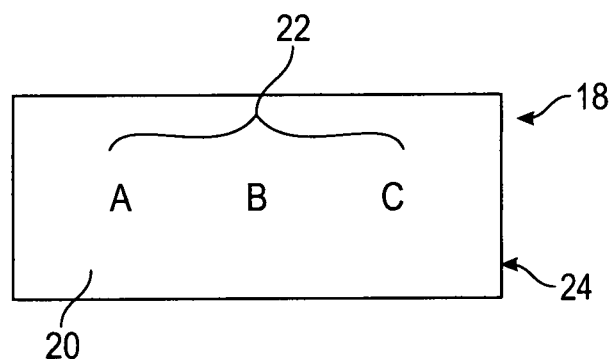
FIG. 1a is a view of a surface of a card, with information provided, such as by writing, on the surface of the card.

A view of an exemplary card 18 is depicted in FIG. 1a. The card 18 can be any size, but is assumed for the following discussion to be approximately the size of a typical business card. The card 18 has a blank surface 20 on which information 22, such as writing or a drawing, can be provided by a spectator. The other side 24 of the card 18 can be printed as a typical business card, with contact information for the performer. The blank surface 20 of the card is considered to have a background surface color, and as will be explained in more detail later, the scanner 10 distinguishes the information from the background surface color of the card 18.

It is to be understood that the term "card", although described above and below as a business card shaped object in the above and following description, can take various other forms, such as pieces of notepaper, index cards, post-it style notes, etc. The material of the card can be other than paper, such as cardboard, plastic, laminate, etc. Hence, when referring to a card in this detailed description and in the claims, information-bearing objects other than business cards are also included.

Figure 2:
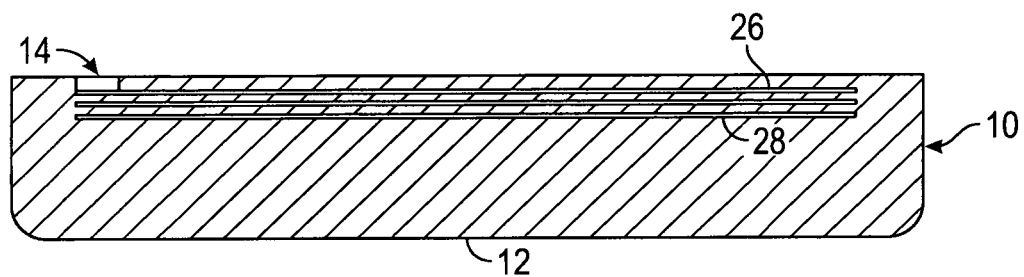
FIG. 2 is a cross-sectional view of the concealed scanner of FIG. 1 according to cross-section I-I of FIG. 1.

The scanner 10 is depicted in cross-section in FIG. 2, in accordance with line II-II of FIG. 1. The scanner 10 includes electronic circuitry on a circuit board 26 of the scanner 10, the circuit board 26 and electronic components depicted in phantom in FIG. 2. An image screen 28 is coupled to a back side of the circuit board 26. The components of the electronic circuitry will be described in more detail later with respect to FIG. 6 and FIG. 9. One notable component of the electronic circuitry visible in the cross-section is a camera 30. In certain embodiments, an infrared camera (not shown)

is provided to provide greater visibility of the image of the card 18 when the image is captured in very low-light situations.

Figure 3:
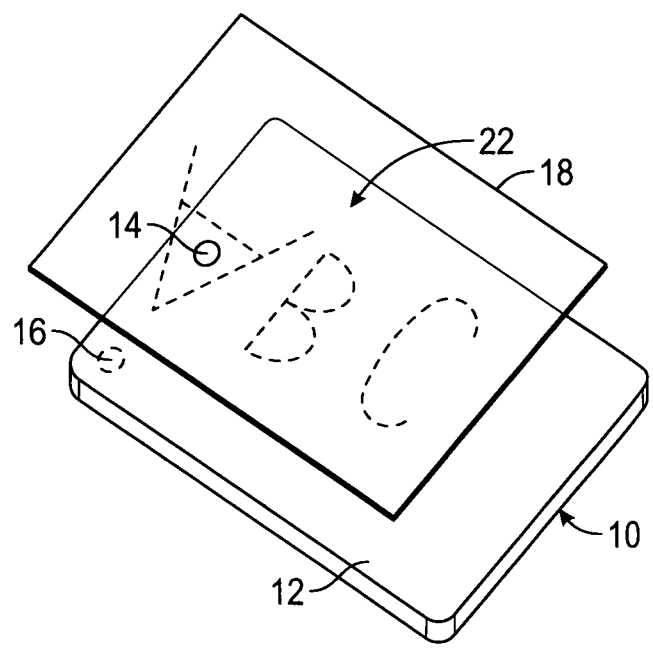
FIG. 3 is a perspective view of the concealed scanner of FIG. 1, with the card of FIG. 1a in position for scanning above the concealed scanner in accordance with certain embodiments of the method of the present disclosure.

FIG. 3 shows a perspective view of a card 18 positioned over the camera 30 of the scanner 10 to allow the information 22 on the card 18 to be captured surreptitiously. As can be seen in FIG. 3, the card 18 is preferably held parallel to the scanner 10 at some distance above the camera 30. This allows the camera 30 to capture all of the information 22 on the card 18. The information 22 is depicted in phantom in FIG. 3 to indicate that the card 18 is face down so that the performer will not be able to see the information 22 on the card 18. After the card 18 is scanned, the card 18 can be handed to the spectator to put away or hold, or anything else the performer desires. Advantageously, the card 18 does not have to put into the cover 12 to allow the performer to ascertain the information 22.

Figure 4:
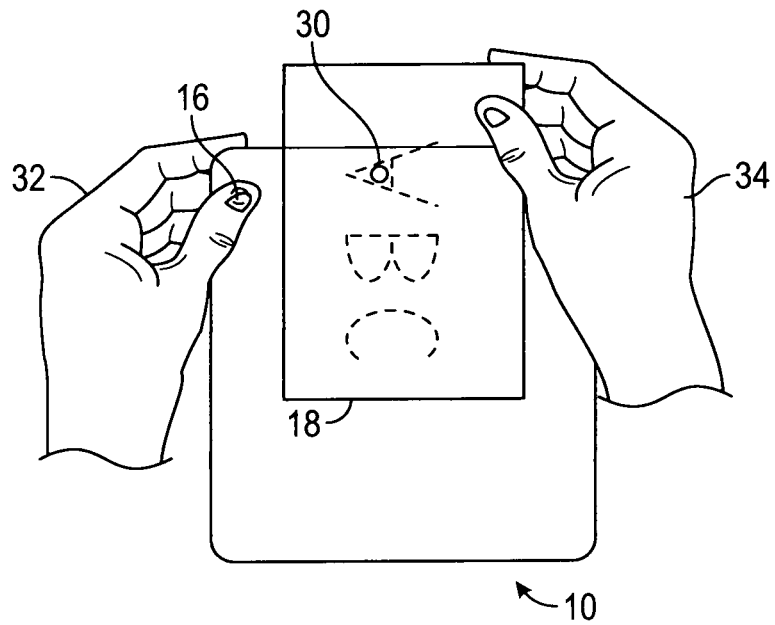
FIG. 4 is a perspective top view of the concealed scanner of FIG. 1, depicting the card of FIG. 1a being held in a right hand of the performer above a camera of the concealed scanner in position for scanning, and a left hand holding the concealed scanner with a left thumb above a tactile actuator for the camera, in accordance with certain embodiments of the method of the present disclosure.

An embodiment of handling of the concealed scanner 10 to capture an image of the card 18 is depicted in FIG. 4. A left hand 32 of the performer holds the scanner 10, while a right hand 34 of the performer holds the card 18 above the camera 30 at an appropriate distance to allow the image of the card 18 to be captured. The thumb of the left hand 32 is positioned on the cover 12 over the switch 16. To capture the image, the thumb presses on the cover 16 to close the switch 16 and take a photo image of the card 18. To provide feedback to the performer, the switch 16 is a tactile switch in certain embodiments, so that the performer will feel the actuation of the switch 16. This lets the performer know that the image has been captured. In certain embodiments of the invention, haptic feedback, such as a mild vibration, may be provided to the performer through the cover 12 to assure the performer that the camera 30 has been successfully actuated by the depression of the switch 16. If the card 18 is properly positioned over the camera 30, then the performer will know from the haptic feedback that an image of the card 18 has been captured.

The scanner 10, following capture of an image of the card 18, performs image processing in a manner to distinguish the outline of the card 18 from the environment above and around it. In other words, the boundaries of the card 18 are distinguished from a ceiling above, in a typical indoor environment. In other environments, the card 18 is distinguished from other objects, or the sky in an outdoor environment, for example. The image processing also distinguishes the information 22 on the card 18 from the background surface of the card 18 itself. Hence, the image processing in accordance with certain embodiments, determines the background surface color of the card 18 within the determined card boundaries, and reproduces the information 22 from what is not considered the background surface color within the card boundaries. Once processed, the image of the information 22 is then available for display on the image screen 28.

Figure 5:
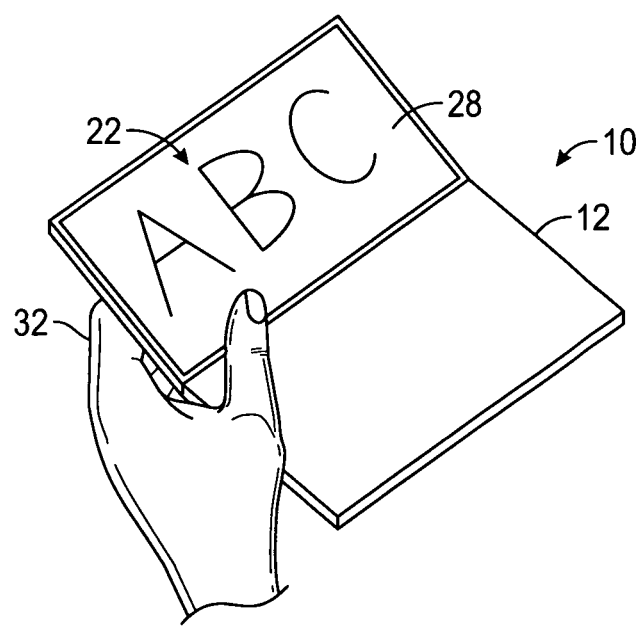
FIG. 5 is a perspective view of the concealed scanner in accordance with embodiments of the present disclosure, held by a performer so that the cover is opened to reveal a previously concealed display.

FIG. 5 shows a perspective view of the performer's hand 18 holding the scanner 10 after opening the cover 12 to reveal the image screen 28. The performer can do so in a manner that does not arouse suspicion, such as by taking out an envelope or another card 18 (depicted in FIG. 5) from the cover 12. The image screen 28 will be angled towards the performer so that the spectator will not see the image screen 28. As the image is enhanced, the information 22 stands out clearly to the performer so that only a quick glance is needed to ascertain the information 22. After glancing at the information 22, the performer simply closes the cover 12.

Figure 6:
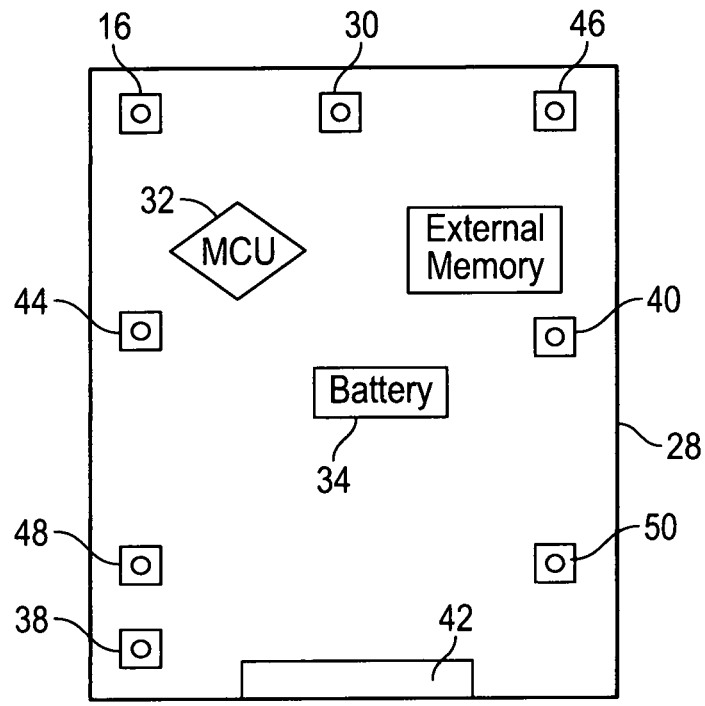
FIG. 6 is a plan view of a circuit board of a concealed scanner constructed in accordance with embodiments of the present disclosure.

An exemplary embodiment of the circuit board 26 of the scanner 10 is depicted in FIG. 6. In this illustrated embodiment, the circuit board 10 has mounted on it the camera 30 and the switch 16 that operates the camera 30. A microcontroller unit (MCU) 32 controls the functioning of the scanner 10. A battery 34, which is rechargeable in certain embodiments, is provided and rechargeable by external power provided though a USB port 38. A power switch 40 is operable to turn on and off the scanner 10, although a timeout default can be set to turn the scanner 10 off after a settable period of no activity. An external memory 36 is provided in certain embodiments to allow a larger number of images to be stored than the number of images that can be stored in the MCU 32. A display connector 42 is provided on the circuit board 26 to connect the circuitry of the scanner 10 to the image screen 28. A number of assignable switches are provided that allow for additional control by the performer of additional functions that can be provided in certain embodiments. For example, switch 44 can provide menu functionality to the performer. Switch 46 can provide zoom function to allow the image on the image screen to be zoomed. Switches 48 and 50 can provide next and previous functions for browsing multiple images or navigating a menu.

Figure 7:
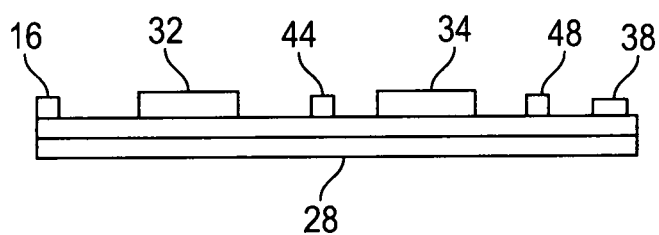
FIG. 7 is a side view of the circuit board of FIG. 6, with a display attached to the underside of the circuit board, in accordance with embodiments of the present disclosure.

The components mounted on the circuit board 26 are conventional. For example, the camera 30 is a VGA smartphone camera, the MCU is a PIC 32 MHZ microcontroller, the battery is a lithium ion 4.2V 200 mAh battery. As seen now in FIG. 7, the image screen 28 is mounted back to back with the circuit board 26 in certain embodiments, and connected through the display connector 42. This creates a one-piece scanner unit to place into the cover 12 and reduces the size of the scanner 10 and thereby enhances the overall deceptiveness of the scanner 10.

Figure 8:
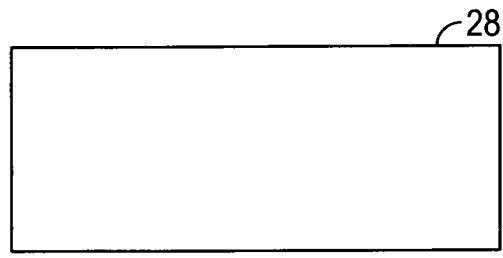
FIG. 8 is a plan view of the display according to certain embodiments of the present disclosure.

In certain embodiments, as shown in FIG. 8, the image screen 28 is an Eink, or Epaper display, which can be a 416×240 pixel, 4-grayscale display, for example. Such displays are commonly available. An advantage to a performer of an Epaper display is the lack of a glowing light common on smartphones. Such a glow would arouse the suspicion of a spectator when the performer opens the cover 12 to peek at the information 22 on the image screen 28, especially in darkened environments in which such performers often work.

Figure 9:
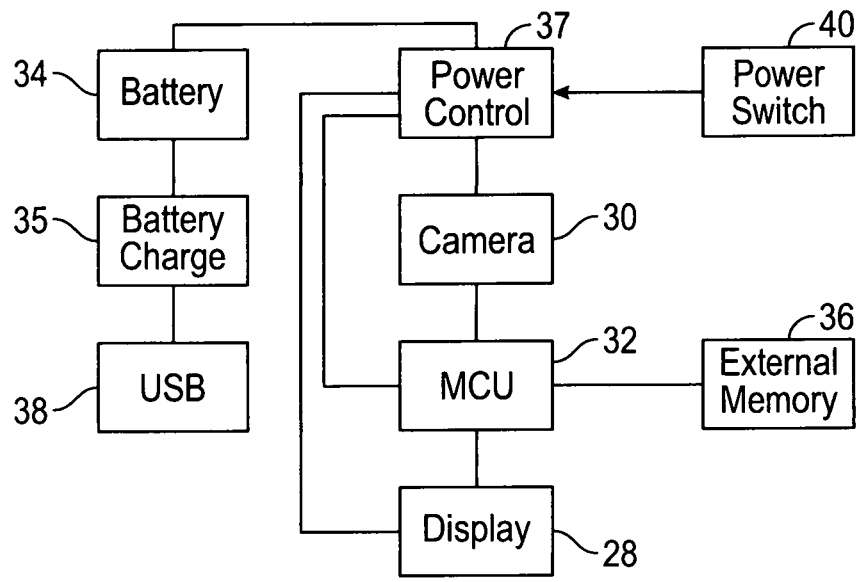
FIG. 9 is a block diagram depicting components of the concealed scanner in accordance with certain embodiments of the present disclosure.

AN exemplary block circuit diagram of the scanner 10 is depicted in FIG. 9. The MCU 32 is connected to the camera 30 and the image screen 28, as well as the external memory 36. The rechargeable battery 34 is connected through a battery charging circuit 35 to the usb port 38 that provides external power to charge the battery 34. A power control circuit 37 controls the power provided to the various components and is operated by the power switch 40. The other switches 16, 44, 46, 48 and 50 depicted in FIG. 6 are connected to the MCU 32.

The following paragraphs describe in more detail an exemplary method carried out by the MCU 32 to process the image captured by the camera 30. This image processing is performed in a manner intended to distinguish the card 18 from its surroundings, and the information 22 on the card 18 from the card itself.

Figure 10:
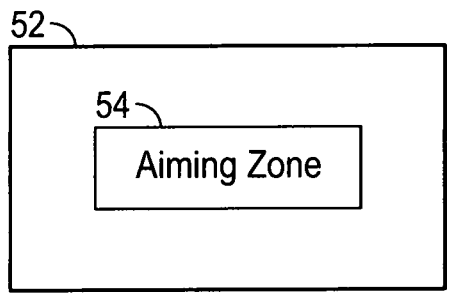
FIG. 10 depicts a step in processing of a captured image in which an aiming zone is determined in accordance with embodiments of the present disclosure.

Once an image of the card 18 has been captured, in the manner depicted in FIGS. 3 and 4, for example, the captured image is stored in memory, whether external memory 36 or internally within the MCU 32. As shown in FIG. 10, an aiming zone 54 is selected from the captured image 52 by the MCU 32. This aiming zone 54 is, in certain embodiments, an area that is approximately 20% of the length of the captured image 52, and 20% of the width of the captured image 52, and is centered in the captured image 52. By using an aiming zone 54 centered within the captured image 52, it is more likely that the processing of the pixels within the aiming zone 54 represents an image of the card 18 and not the background surrounding the card 18, such as a ceiling.

Figure 11:
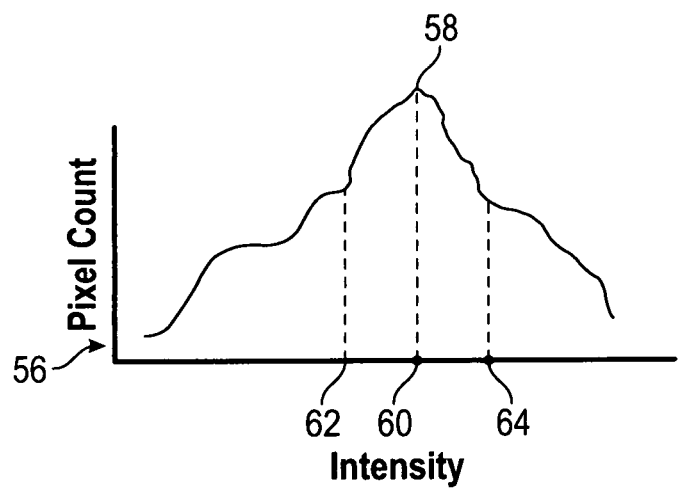
FIG. 11 depicts an exemplary color histogram plot of the aiming zone shown in FIG. 10.

Next, a color histogram plot 56 of the pixels in the aiming zone 54 is created, an exemplary plot being shown in FIG. 11. The plot 56 has pixel count on the y-axis and intensity on the x-axis. In order to determine the card background color of the card 18, for example, a basic white background, the intensity value of the highest pixel count is determined. In FIG. 11, the highest pixel count is at point 58. The intensity value for this highest pixel count is shown at point 60 on the intensity (x) axis. In other words, in the aiming zone 54, more pixels had this intensity value (at point 60), than any other intensity value. To determine a card background color, a range of intensity values is now determined. For example, and as shown in FIG. 11, intensity values at points 62 and 64 on either side of point 60 on the intensity axis form a range of intensity values. These points represent, for example, 15% below and 15% above the intensity value 60 of the highest pixel count intensity value. The MCU 32 will now consider intensity values that fall within this range to be background surface color of the card 18, and everything outside of this range to be other than the background surface color of the card 18. In this way, the background surface of the card 18 can be distinguished from the surrounding environment as well as from the information 22 on the card 18 in further processing.

Figure 12A:
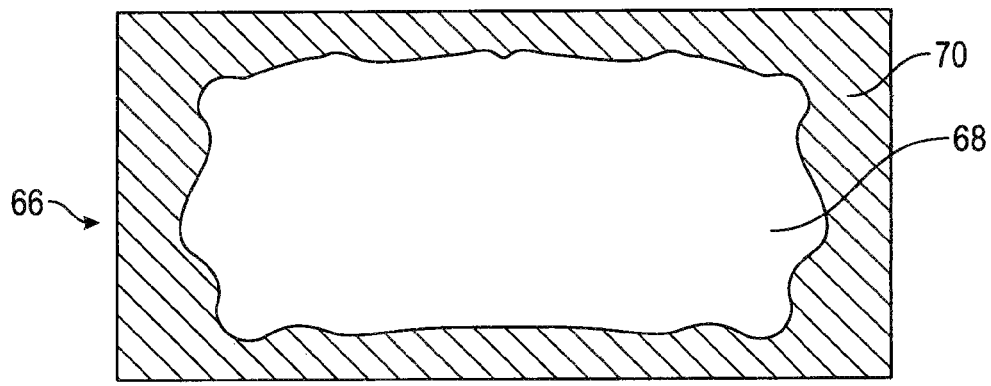
FIG. 12a depicts an exemplary mask based on the color histogram plot depicted in FIG. 11.
Figure 12B:
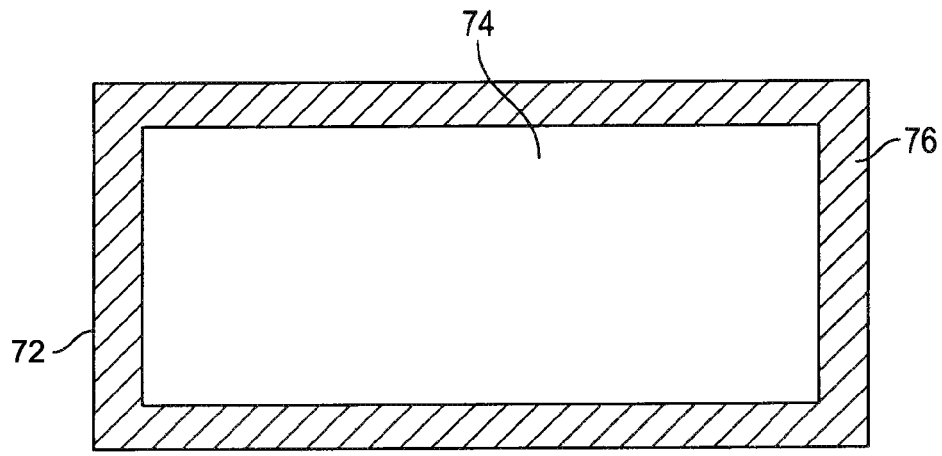
FIG. 12b depicts an exemplary stencil.

FIG. 12a shows a mask 66 and FIG. 12b shows a stencil 72 that the MCU 32 will form and combine to determine the boundaries of the card 18 within the captured image. The MCU 32 uses the determined intensity range from FIG. 11 to create the mask 66. Every pixel falling within the determined background color intensity range of FIG. 11 within the captured image 52 is assigned, for example, with a value of +1, and those pixels having intensity values falling on either side of this intensity range are assigned a value of −1, for example. This results in the +1 area 68, representing a rough image of the card boundaries, and the −1 area 70, representing outside the card boundaries.

The MCU 32 creates the stencil 72 with a regularly shaped border for a determined background color intensity range. The +1 area 74 represents a regularly shaped boundary of a card 18, while the −1 area 76 represents outside the card boundaries. The MCU 32 now compares the stencil 72 to the mask 66 and tries to match the stencil 72 to the mask. This comparison is performed according to the equation over all pixels: ΣMASK(X, Y)*STENCIL(X, Y). As the sum increases, the correlation improves and thereby the image improves. A contrast normalized stencil is thus produced.

Figure 13:
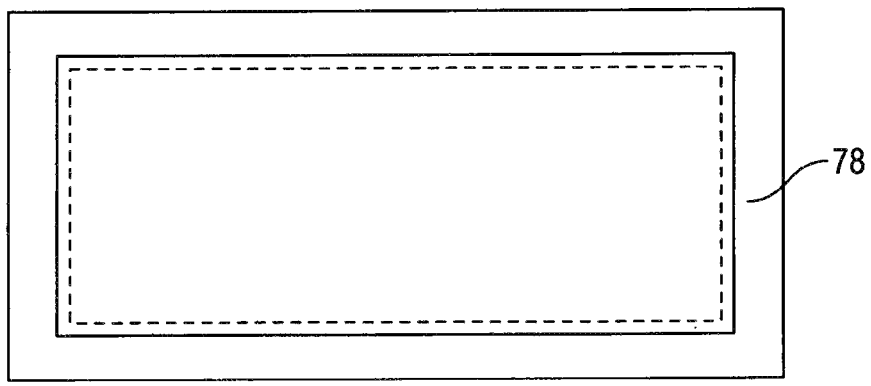
FIG. 13 depicts a captured image after the combined stencil and mask are applied to the captured image in accordance with embodiments of the present disclosure.
Figure 14:
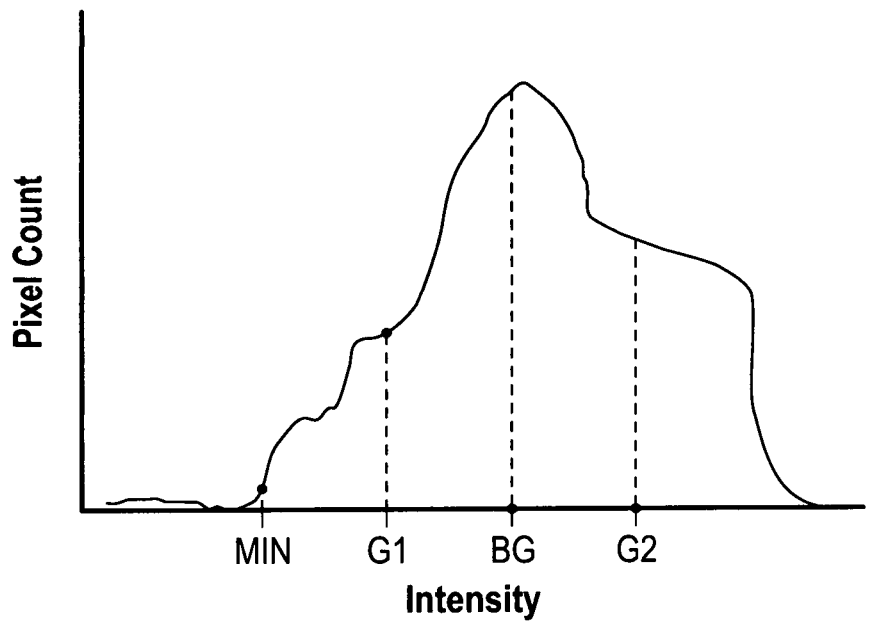
FIG. 14 depicts an exemplary color histogram plot of the stenciled captured image of FIG. 13 in accordance with embodiments of the present disclosure.

The MCU 32 now applies the contrast normalized stencil from the above steps to the captured image, to produce a resultant stenciled image 78. FIG. 13 depicts the resultant stenciled image of the captured image. In certain embodiments, a small margin, such as 2%, is cropped from the stenciled image 78. Another color histogram plot is now created, this time of the cropped stenciled image 78. An exemplary color histogram plot of the stenciled image 78 is depicted in FIG. 14. Again, pixel count is on the y-axis and intensity is on the x-axis. The intensity value (BG) of the highest pixel count is determined. This BG value should represent the background color of the card 18. A MIN intensity value is determined where the pixel count is at a minimum. The MCU 32 then determines the intensity value G1 of the intensity that is midway between MIN and BG. The MCU 32 will then determine a value G2 that is equal to BG+(G1-MIN).

Figure 15:
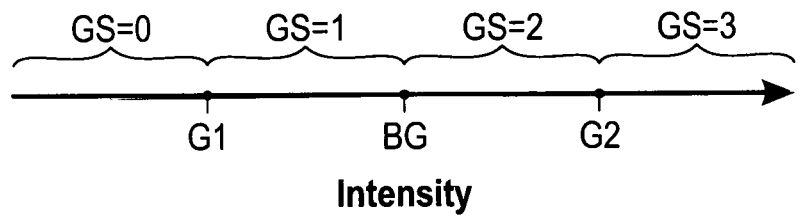
FIG. 15 is a representation of the formation of a reduced grayscale based on the exemplary color histogram plot of FIG. 14.

As shown in FIG. 15, the MCU 32 now creates a four-value grayscale (GS0-GS3) based on the intensity ranges between the values of MIN, G1, BG and G2. All pixels that are scanned and have an intensity value below G1 will be assigned a grayscale value of zero, or GS=0. All pixels with an intensity value between G1 and BG will be assigned a grayscale value of one, or GS=1. All pixels with an intensity value between BG and G2 will be assigned a grayscale value of two, or GS=2. And all pixels with an intensity value greater than G2 will be assigned a grayscale value of three, or GS=3.

Figure 16:
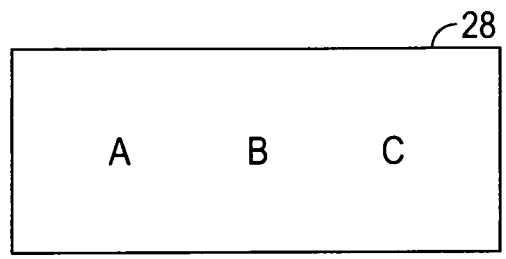
FIG. 16 is a view of a displayed image formed after processing of the embodiments of the disclosure.

The original captured image 52 is now scanned again by the MCU 32, applying the four grayscale values GS=0 to GS=3 to the pixels. The resultant image 80, shown in FIG. 16, can then be displayed on the image screen 28, as shown earlier in FIG. 5. It is noted that throughout the drawings, the information "ABC" has been employed for descriptive and illustrative purposes. Any writing, drawing, printing, or other type of information can be the information 22 for purposes of the described embodiments.

Figure 17A:
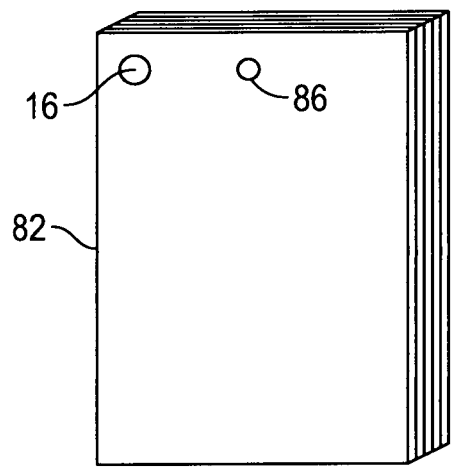
FIG. 17a is a perspective view of another embodiment of a cover for a concealed scanner, from a front view.
Figure 17B:
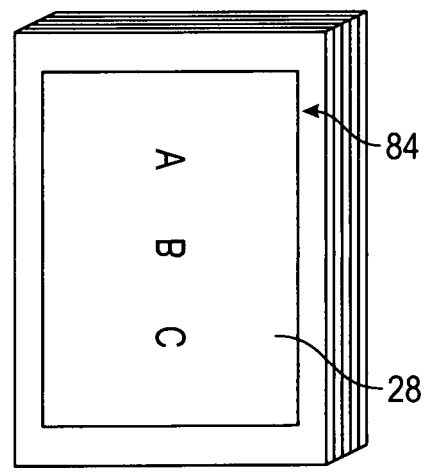
FIG. 17b is a perspective view of the concealed scanner from a rear view, in which the display is exposed to the performer.

Although a cover 12 has been described as a wallet in certain embodiments and the previously described figures, other covers can be employed that allow surreptitious capture of an image and peeking of the information 22. For example, FIG. 17a shows a perspective view of the front of a stack 82 of business cards that have been glued together and a recess cut through one side to hold the circuit board 26 and the image screen 28. FIG. 17b shows the rear of the stack 82, with the recess 84 available to receive the circuit board 26 and image screen 28. The front of the stack has an aperture 86 through which the camera 30 can image the information 22. The top of the stack 82 is what the spectator will see. When the performer wants to peek at the captured and processed image, he or she merely has to turn over the stack 82 angled towards himself or herself to see the image screen 28. This can be easily hidden from a spectator. This is just one alternate embodiment for a cover 12, as performers can realize other types of deceptive covers 12 to conceal the scanner while allowing capturing and peeking of an image.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure us explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principled defined herein may be applied to other aspects. Thus, the claims are not intended to be limited to the aspects shown herein, but are to accorded the full scope consistent with the language of the claims, wherein reference to an element in the singular is not intended to mean "one and only one: unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any are used for convenience only and do not limit the subject disclosure.

What is claimed is:

1. A concealed card scanner, comprising:
   a camera that surreptitiously captures an image of a card;
   a processor that processes the captured image to produce a processed image;
   an image screen that displays the processed image; and
   a cover configured to conceal the camera during image capture and allow selective and surreptitious access to the image screen;
   wherein the processor is configured to process the image so as to distinguish information on the card from a background surface color of the card, and to create the processed image such that the information on the card is visually enhanced;
   wherein the image screen is an Epaper display; and
   wherein the processor is configured to distinguish the information on the card from the background surface of the card by performing the steps of:
   determining boundaries of the card from the captured image, with each pixel of the captured image being assigned to one of n grayscale values;
   normalizing contrast of the captured image after the boundaries of the card are determined;
   determining a reduced grayscale mapping to convert the n grayscale values of the captured image to m grayscale values, where m is less than n; and
   scanning through the captured image pixels to re-assign the grayscale value for each pixel based on the determined reduced grayscale mapping.

2. The scanner of claim 1, wherein the step of determining boundaries of the card includes the steps of:
   determining an aiming zone of the captured image;
   forming a color histogram plot of pixel count versus intensity of the aiming zone;
   determining the intensity of the highest pixel count in the color histogram plot of the aiming zone; and
   creating an intensity range centered on the intensity of the highest pixel count in the color histogram plot of the aiming zone; and
   designating pixels in the captured image having intensity falling within the intensity range as the background surface color of the card, and pixels in the captured image having intensity falling outside of the intensity range as other than the background surface color of the card.

3. The scanner of claim 2, wherein the step of normalizing contrast includes the steps of:
   forming a mask by assigning a first value to the pixels in the captured image that are designated as the background surface color of the card and assigning a second value to the pixels in the captured image that are designated as other than the background surface color of the card;
   forming a stencil by creating a card image having pixels assigned to the first value forming a regular shape representing the boundaries of the card, and pixels assigned to the second value representing the portions of the captured image outside the boundaries of the card; and
   summing over all pixels (x,y) the mask multiplied by the stencil to form a contrast normalized stencil such that over all pixels: $\Sigma MASK(X,Y)*STENCIL(X,Y)$.

4. The scanner of claim 3, further comprising the step of applying the contrast normalized stencil to the captured image to form a stenciled image.

5. The scanner of claim 4, wherein the step of determining a reduced grayscale mapping includes:
   forming a color histogram plot of the pixel count versus intensity of the stenciled image;
   determining the intensity (BG) of the highest pixel count in the stenciled image color histogram plot;
   determining the intensity MIN of the lowest pixel count having intensity that is below the intensity (BG) of the highest pixel count;
   determining the intensity (G1) of a point on the intensity axis of the stenciled image color histogram plot that is midway between MIN and BG; and
   determining the intensity (G2) that is equal to the intensity BG plus the difference of the intensity at midway point G1 and the intensity at the lowest level pixel count MIN, such that $G2=BG+(G1-MIN)$.

6. The scanner of claim 5, wherein the step of reducing the grayscale mapping further includes scanning through the captured image and assigning one of four new grayscale values to each pixel of the captured image, the first new grayscale value (GS=0) being assigned to pixels in the captured image having intensity between 0 and G1; the second new grayscale value (GS=2) being assigned to the pixels in the captured image having intensity between G1 and BG; the third new grayscale value (GS=3) being assigned to the pixels in the captured image having intensity between BG and G2; and the fourth new grayscale value (GS=4) being assigned to the pixels in the captured image having intensity greater than G2, the processor thereby forming a reduced grayscale image of the captured image.

7. The scanner of claim 6, wherein the processor sends the Epaper display the reduced grayscale image to display.

8. The scanner of claim 7, wherein the cover has an aperture through which the camera surreptitiously captures the image of the card.

9. The scanner of claim 8, wherein the camera has a tactile switch actuatable through the cover to cause the camera to capture the image of the card.

10. The scanner of claim 9, wherein the cover is openable to reveal the Epaper display.

11. The scanner of claim 10, wherein the cover is a wallet.

12. The scanner of claim 10, wherein the cover is a stack of paper with a recess within the stack that contains the camera, the processor and the image screen.

13. A method of secretly viewing information on a card, comprising the steps of:
   positioning the card over a concealed camera such that the information is not viewable by a person, with the information being exposed to the concealed camera, the camera being concealed by a cover;
   causing the camera to capture an image of the card and the information on the card by surreptitiously actuating a concealed tactile actuator through the cover; and
   secretly peeking a display of the captured image by opening the cover to reveal the display only to a person opening the cover;
   wherein the display is an Epaper display;

wherein the cover is a wallet, the wallet having an opening for a camera lens of the camera, and allowing a tactile actuation of the tactile actuator through the wallet;

further comprising the steps of processing the captured image prior to display, the processing including the steps of:

detecting the boundaries of the card in the captured image;

determining the background color of the card in the captured image;

normalizing contrast of the captured card image;

determining a reduced grayscale for the captured image;

applying the reduced grayscale to each pixel of the captured image; and reproducing the captured image with the reduced grayscale for each pixel.

14. The method of claim 13, wherein the reduced grayscale is a four-level grayscale.

* * * * *